United States Patent [19]

Stockburger et al.

[11] Patent Number: 4,629,873

[45] Date of Patent: Dec. 16, 1986

[54] METHOD AND MEANS FOR PRODUCING AND ANALYZING SECRET IDENTIFYING CODE MARKS IN MACHINE-SCANNED DATA CARRIERS

[76] Inventors: Hermann Stockburger, Kirnachweg 7, D-7742 St. Georgen; Hans-Georg Winderlich, Niedere Strasse 36, D-7730 Villingen, both of Fed. Rep. of Germany

[21] Appl. No.: 578,602

[22] Filed: Feb. 10, 1984

Related U.S. Application Data

[63] Continuation of Ser. No. 369,212, Apr. 16, 1982, abandoned, and a continuation of Ser. No. 158,446, Jun. 11, 1980, abandoned.

[30] Foreign Application Priority Data

Jun. 15, 1979 [DE] Fed. Rep. of Germany ....... 2924325

[51] Int. Cl.⁴ ............................................. G06K 19/00
[52] U.S. Cl. ................................ 235/380; 340/825.34; 235/489
[58] Field of Search ....................... 340/825.33, 825.34, 340/825.3; 235/380, 487, 489, 493

[56] References Cited

U.S. PATENT DOCUMENTS

| | | | |
|---|---|---|---|
| 3,513,298 | 5/1970 | Riddle et al. | 340/825.33 |
| 3,665,162 | 5/1972 | Yamamoto et al. | 340/825.33 |
| 3,761,683 | 9/1973 | Rogers | 340/825.33 |
| 3,862,716 | 1/1975 | Black | 340/825.33 |
| 3,906,447 | 9/1975 | Crafton | 340/825.33 |
| 3,985,998 | 10/1976 | Crafton | 340/825.33 |
| 4,013,894 | 3/1977 | Foote et al. | 340/825.33 |
| 4,025,759 | 5/1977 | Scheffel | 235/487 |
| 4,048,475 | 9/1977 | Yoshida | 235/380 |

*Primary Examiner*—Donald J. Yusko
*Attorney, Agent, or Firm*—Donald Brown

[57] ABSTRACT

For producing and evaluating secret identification code marks on data carriers of the kind adapted to be scanned by machines specific parameters are recorded in encoded form. In order to reach a high degree of security in respect of fraud or counterfeit without requiring a complicated and expensive production process the identifying parameter is processed in accordance with an unequivocally reversible mathematical rule. The individual parameter may contain an encoded calculation rule. The processing of an identification number contained in the said parameter takes place in accordance with that rule.

4 Claims, 4 Drawing Figures

METHOD AND MEANS FOR PRODUCING AND ANALYZING SECRET IDENTIFYING CODE MARKS IN MACHINE-SCANNED DATA CARRIERS

This application is a continuation of application Ser. No. 369,212, filed Apr. 16, 1982 and Ser. No. 158,446, filed June 11, 1980, both abandoned.

FIELD OF INVENTION

This invention relates to a method of producing and analysing or evaluating secret identifying code marks in data carriers of the kind adapted to be scanned by machines and comprising at least one information trace or panel, wherein at least one individually specific parameter of the data carrier is converted into a unique identifying code number which is recorded on the data carrier in encoded form, the same parameter being ascertained for evaluation and the code number which is produced therefrom being compared with the decoded identifying number.

BACKGROUND OF THE INVENTION

With the increasingly more widespread use of identity cards, cheque cards, personal code-key cards and the like it is becoming increasingly more important to safeguard such cards against abuse, forgery and deception. It is known to provide identifying cards of the kind in question with an information carrier embedded therein which contains an alpha-numerical card number in digital form. This card number is also interleafed with parts of the principal information recorded in a principal information trace. In other words, the principal information trace contains a mixed information consisting of principal information data and the card number. The card number is concealed in the principal information and difficult to isolate and identify. For checking, or verifying the card, the card number is filtered out of the principal information trace and compared with the fixed card number recorded on the accessory or secondary information carrier. The card will be accepted as genuine only if the said fixed card number agrees with the concealed card number in the principal information trace. This makes it impossible to transfer any information recorded, for example in a magnetic trace of an identity card by duplication to the information trace of another card without such deception being detected, because the cards are relatively clearly distinguished by the fixed information carriers embedded therein which show relatively different card numbers.

According to another known identification method a specifically individual information is stored unchangeably on an identifying card. When this identifying, or code-card is initially set up the permanent information present on that card is tied or linked with a secret key information and recorded on the information trace of the card. For checking the identifying code card a testing information is formed from selected parts of the permanent information and of the secret key information and this is checked for agreement with the permanent information stored on the card.

These conventional methods simply involve a process of interleafing or interweaving the information which is fixedly applied to the data carrier into the useful information. The interleafing pattern is however liable to be detected by a comparison of several cards with each other. For this reason conventional methods additionally resort to a complex technology in the production of the cards in order to prevent counterfeit right from the setting up of the data carrier.

SUMMARY OF THE INVENTION

It is the aim of the present invention to provide a method of the kind specified which affords a high degree of security in respect of fraud or counterfeit by virtue of the type and nature of the coding pattern so that the actual card material as such requires no complicated and expensive production process.

In pursuit of this aim the present invention provides that the identifying code number is processed in accordance with an unequivocally reversible arithmetic rule.

For example, according to this invention the identifying number may be encoded by being multiplied with a specific factor whilst being divided by the same factor for decoding. Addition or subtraction are also possible. Falsification-security may be further improved by processing individual parts of the identifying number, e.g. individual digits or figures according to relatively different arithmetic rules. For example individual figures or groups of figures in the identifying number may be multiplied by other factors than other figures or groups of figures. In addition to this the encoded number may also be interwoven or interleafed in the useful or purpose information.

The useful or purpose information to be recorded on the card may be encoded and recorded in the same way as the identifying number. In this manner the purpose information is encyphered and cannot be decyphered without knowing the processing rule or formula. In other words, the purpose information is secured not only against unauthorized transfer to another card but also against decyphering of the information concerned. This may be important, for example in the case of cheque cards where the information trace, besides carrying other data, also reflects the state of the owner's account. Should the account card fall into unauthorized hands it is perfectly safe in as much as the state of the account cannot be decyphered without knowledge of the specific arithmetic rule.

According to an attractive further development of this invention the individual parameter which is specific to each card may contain a processing rule or instruction. Whilst the system as a whole admits a wide range of arithmetic processing rules the individual parameter will specify in each case a specifically selected processing rule according to which the identifying number and, where desired also the purpose information, are encoded as well as decoded. This processing rule is itself provided in encoded form, e.g. "processing rule No. 6" on the data-carrier material so that a forger cannot learn anything about the special application of the processing rule. In other words, the data carrier contains in fixed form the identifying number as well as the arithmetic processing rule according to which the said number must be encoded for being recorded in the vehicle information trace. The encoded identiying number is recorded for the first time in the variable information trace when the identifying card is initially made out or "loaded". On this occasion a reading device ascertains or measures the individual parameter and splits it up into the calculating rule and the identifying number. The identifying number is then processed in accordance with the calculating rule and recorded as mixed information together with the purpose information in the variable information trace.

A device for producing identifying code marks in accordance with the method of this invention is characterised in that a reader device, for ascertaining the individual parameter of the data carrier in each case feeds the identifying number to an encoder device and a code information to a control device which contains a plurality of calculating rules or specifications, that the said control device feeds a calculating rule or specification which corresponds to the code information to the encoder device for processing the identifying number and that the encoder device controls a recording device which inscribes the information trace or panel.

Thus the calculating rule or specification according to which the identifying number is encoded is comprised in the individual parameter of the data carrier and may vary from data-carrier to data carrier. This makes unauthorised inscription of the data carriers very difficult as this is not possible without a specific identifying marking device containing a corresponding encoder device.

The blank data carrier may be further safeguarded by providing the identifying marker device with a scanning device for detecting the position or extension of an identifying mark on the data carrier and converting such position or extension (direction) of the identifying mark into a digital value which is fed, together with the identifying number picked up by the reader device, to a comparator and checked for agreement with the identifying number. In that case the position, extension or direction of the identifying mark must agree with the respective identifying number applied in digital form to the data carrier. Since the identifying mark is already applied to the blank data carriers the latter can be checked for forgeries even if the recording trace has not yet been inscribed. No special demands are made with regard to the card material and fabrication technology so that the blank cards can be fairly inexpensive. The identifying mark may be produced by printing methods.

An analyser or evaluator device for application in the method according to this invention is characterised in that a first reader device, for ascertaining the individual parameter of the data carrier, in each case feeds the respective identifying number to the input of a comparator and the encoding information to one control or gate input of a decoder, that a second reader device scanning the informtion trace or the information panel feeds the coded identifying number to the input of the decoder and that the output of the decoder is applied to the second input of the comparator. In this way the identifying number which is permanently, or fixedly provided on the data carrier is checked for agreement with the decoded identifying number in the information trace.

The analyser device may further comprise a scanning device for detecting position or direction and extension of an identifying mark on the data carrier, the position or extension and direction of such identifying mark being converted into a digital value which, together with the identifying number picked up by the first reader device is fed to a third input of the comparator and checked for agreement with the identifying number.

In this way the analyser device checks not only whether the identifying number in coded form is contained in the variable information trace but also whether the blank date carrier is genuine. In other words, an analyser device of this kind provides two criteria of authenticity.

BRIEF DESCRIPTION OF THE DRAWINGS

A preferred embodiment of the invention is hereinafter more specifically described by way of example with reference to the accompanying drawings wherein.

Figure 1:
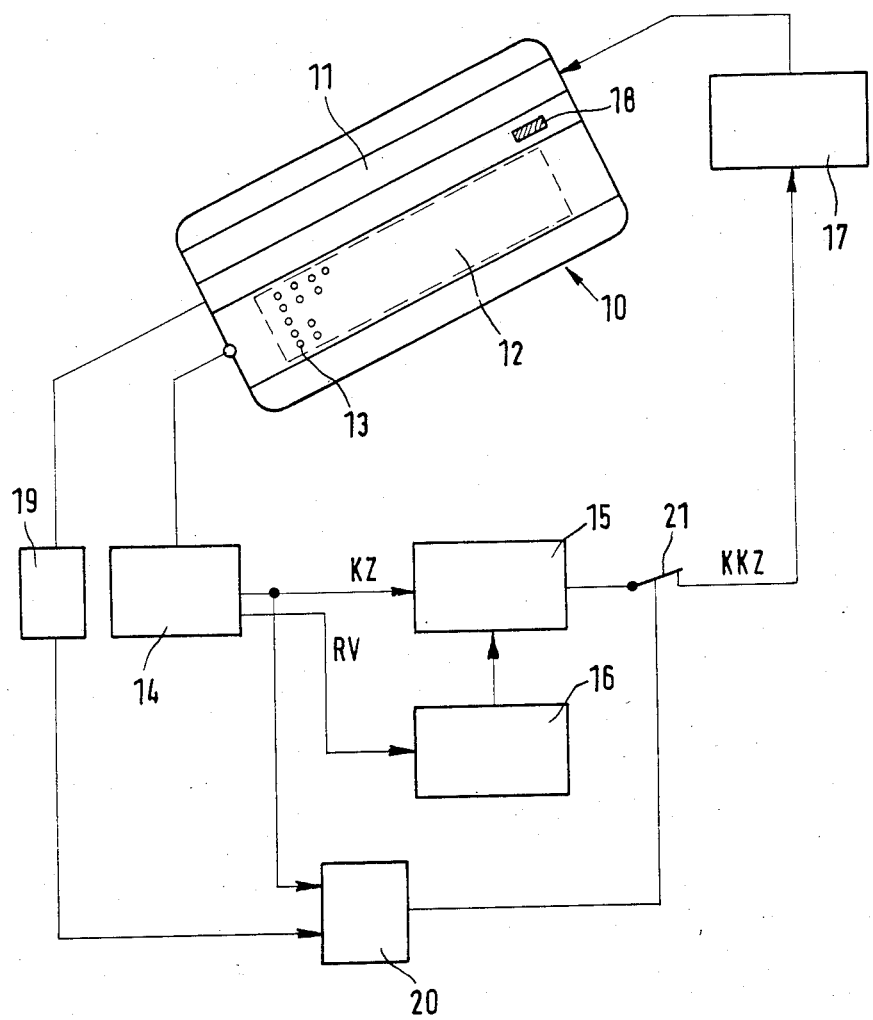
FIG. 1 is a schematic representation of the recording of an inscription on a blank data carrier, FIG. 2 diagrammatically shows an analyser or evaluator device.

In the present example the data carrier is a card 10 for example a cheque- or bank account card, which is used in conjunction with automatic goods- or service dispensing machines capable of reading the contents of a magnetic information trace 11. The card 10 comprises a punch tape 12 embedded therein which can be scanned by a reader machine. This punch tape 12 is not visible from the outside but concealed by covering layers which are permeable by certain rays in respect of which the tape 12 is impermeable.

The first perforation row 13 of the tape 12 is perforated in all punch points; this corresponds to a signal identifying the start of the tape. Next to perforation row 13 the tape 12 comprises a series of perforation rows KZ in which a numerical identifying number has been punched. In a further region RV of the tape the perforation rows are used to characterise a specific calculating rule and lastly the tape comprises a region PZ reserved for test numbers wherein it is determined, e.g. by punching whether the sum of the punched holes in the preceding perforation rows is even or odd, whether a sum of digits is applicable or the like.

For first time inscription of the magnetic trace 11, i.e. when the card 10 is initially made out or "loaded", the card 10 is inserted into a device which comprises a reader device 14 for reading the punch tape 12. This reader device ascertains the identifying number KZ and the calculating rule RV and relatively separates these two informations. The identifying number KZ is fed to an encoder device 15 and the calculating rule RV is fed to a control device 16 for the encoder device 15. This control device 16 contains numerous, consecutively numbered calculating rules or specifications. The signal RV provides the number of a specific calculating rule. The calculating rules stored in the control device 16 may read, for example, as follows: "multiply by 5", "add 65", or "multiply by 7 and add 24". The control device 16 ensures that the identifying number KZ will be processed in accordance with the calculating rule specified by RV. It feeds an encoded number KKZ to a magnetic recorder device 17 which records, or inscribes the encoded identifying number KKZ in the magnetic information trace 11.

For safeguarding the card 10 against forgery an identifying mark 18 is imprinted on the card. In the present example this mark 18 consists on a rectangular panel the length of which has a specific relation to the identifying number KZ. As the card 10 passes through the device the length of the identifying mark 18 is scanned by a further reader device 19 and converted into a numerical value. This numerical value is fed to a comparator 20 which also receives the identifying number KZ. Only if the numerical value of identifying mark 18 agrees with the identifying number KZ will the comparator actuate a switch 21 which is included in the signal line to the magnetic recording device 17 so that data will be recorded in the magnetic trace 11 and the card 10 be "loaded" only if there is agreement between the length of the identifying mark and the identifying number KZ. Besides the encoded identifying number KKZ, the information trace 11 is also inscribed with other purpose information, e.g. the client's account number, the branch number of the bank, the credit balance of the client, period of validity and date of issue of the card 10. In the course of subsequent use of the card the credit balance may be progressively reduced by the value of certain purchases and re-inscribed, to bring the card up to date. Such further data recorded on the magnetic trace 11 besides the encoded identifying number KKZ are also encoded in accordance with the applicable calculation rule RV so that they can be decyphered only with the aid of data KZ and RV recorded in punch tape 12 which together represent a specific individual parameter and that even this can only be done with the aid of a control device wherein the various calculating rules are respectively associated with the signals RV in precisely the same way as in control device 16.

Figure 2:
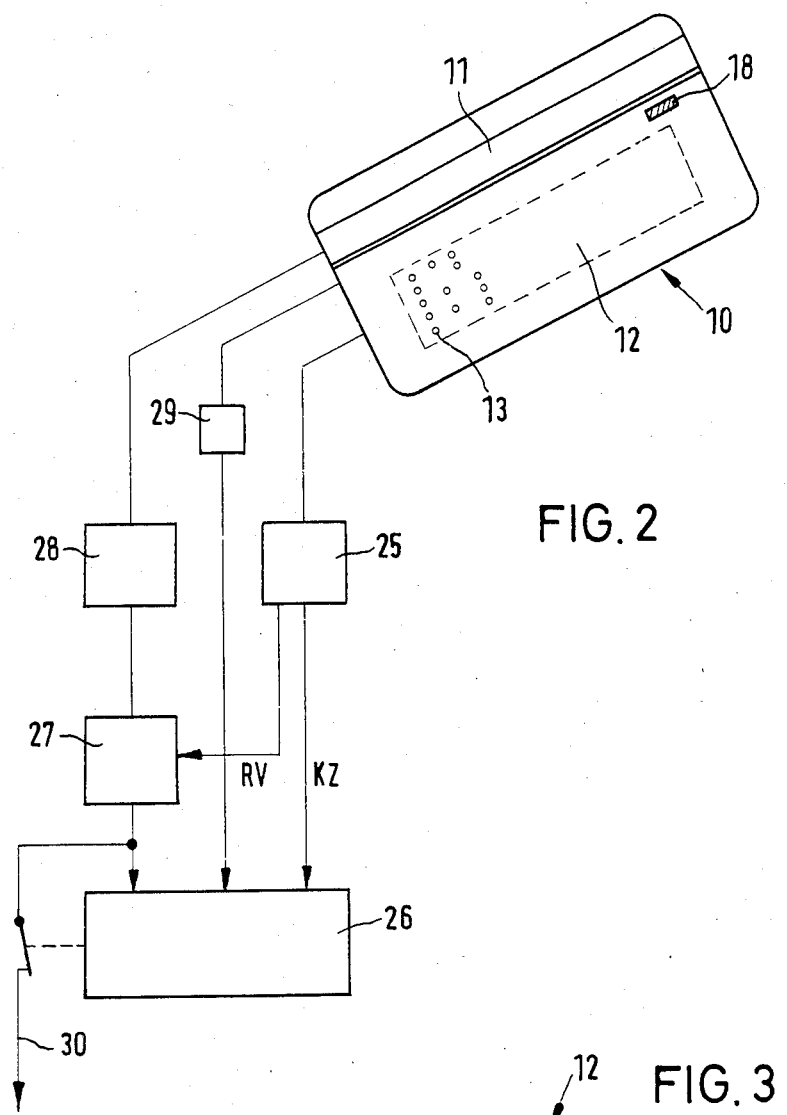
Figure 3:
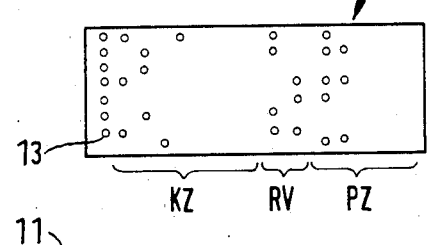
FIG. 3 shows a punch tape incorporated in the data carrier.
Figure 4:
FIG. 4 illustrates the recording on the information trace of the data carrier.

FIG. 2 shows an analyser device of the kind fitted in automatic vending or service machines adapted to be operated by an identifying personal card 10 as hereinbefore described. The drawing is confined to those components which are required for a verification of authenticity of the card. The components for processing the decyphered purpose information are not shown.

The analyser device comprises a first reader device 25 arranged in the same way as reader device 14 to read the data recorded on tape 12. This reader device 25 differentiates between the identifying number KZ which is fed to a comparator 26 and the calculating rule RV which is applied to the control input of a decoder 27. The input of decoder 27 is connected with a second reader device 28 which reads the data of the information trace 11. The decoder 27 decodes the encoded identifying number KKZ in accordance with calculating rule RV and then feeds it to the comparator 26. The latter checks the output signal of decoder 27 for agreement with the identifying number KZ.

A scanner device 29 scans the length of the identifying mark 18 and converts this into a numerical value. The scanner device 29 is arranged in the same way as scanner device 19 in FIG. 1. The output signal of scanner device 29 is also applied to the comparator 26 and the latter will verify authenticity of card 10 only on condition that all three of its input signals are in agreement. Subject to this condition the following further output signals supplied by decoder 27 in accordance with the calculating rule RV will be fed via line 30 to a register- or computer device which evaluates the purpose information inscribed in the information trace 11.

If the three input signals of comparator 26 do not agree with each other no signals will be fed into line 30.

We claim:

1. A data carrier comprising a sheet, magnetic storage media on said sheet, a punch tape embedded in the sheet and concealed from visual viewing, said tape including a first set of data representing identifier information and a second set of data representing instructions for processing said identifier information, an identifying mark on the sheet, said mark having a measurable property which is related to the identifier information, and said magnetic media having data stored thereon related to the identifier information.

2. The data carrier of claim 1 in which the mark comprises an imprint of a rectangle.

3. A system for securing a data carrier which includes a punch tape embedded in the data carrier and concealed from visual view, said tape including a first set of data representing identifier information and a second set of data representing instructions for processing said identifier information, and said data carrier includes an identifier mark, said system comprising first means for measuring a property of the identifier mark to derive a first signal, second means for detecting the second set of data, third means responsive to said second set of data and said first signal to provide a third signal having information related to said identifier mark, and fourth means for recording said third signal on said data carrier.

4. A system for determining the validity of a data carrier which includes a sheet, magnetic storage media on said sheet, a punch tape embedded in the sheet and concealed from visual viewing, said tape including a first set of data representing identifier information and a second set of data representing instructions for processing said identifier information, an identifying mark on the sheet, said mark having a measurable property which is related to the identifier information, and said magnetic media having data stored thereon related to identifier information, said system comprising first means for reading said first set of data on said tape to provide a first signal representing identifier information, second means for reading said second set of data on said tape and providing a second signal, third means for reading said data related to said identifier information stored by said magnetic media and means for processing said data related to said identifier information in accordance with a mathematical rule which depends upon instructions provided by said second signal to provide a third signal, means for measuring a physical property of said mark on said carrier to provide a fourth signal, and means for comparing said first, third and fourth signals.

* * * * *